United States Patent
Heo

Patent Number: 6,120,681
Date of Patent: Sep. 19, 2000

[54] OIL SPILL SKIMMER FOR RECOVERING OIL FROM WATER IN THE EVENT OF OIL SPILL ACCIDENT

[76] Inventor: Won Sang Heo, 180-261 Bongcheon-Dong, Kwanak-Ku, Seoul, Rep. of Korea

[21] Appl. No.: 09/307,178

[22] Filed: May 7, 1999

[51] Int. Cl.[7] .................................................. E02B 15/04
[52] U.S. Cl. .................. 210/86; 210/242.3; 210/170; 210/521; 210/923
[58] Field of Search ................................ 210/170, 242.3, 210/776, 923, 538, 521, 86

[56] References Cited

U.S. PATENT DOCUMENTS

| | | | |
|---|---|---|---|
| 3,722,689 | 3/1973 | Markel et al. | 210/242.3 |
| 3,753,496 | 8/1973 | Boyd | 210/242.3 |
| 3,907,684 | 9/1975 | Galicia | 210/242.3 |
| 4,024,063 | 5/1977 | Mori | 210/923 |
| 4,111,809 | 9/1978 | Pichon | 210/242.3 |
| 4,139,470 | 2/1979 | Stagemeyer et al. | 210/170 |
| 4,265,758 | 5/1981 | Fox | 210/923 |

*Primary Examiner*—Christopher Upton

[57] ABSTRACT

An oil spill skimmer is disclosed. The skimmer is designed to be arranged quickly on an oil-spilled area upon an oil spill accident, thereby quickly recovering oil from water while restricting a spread of oil over a wide area. In the skimmer, upper and lower housings are arranged in the top and bottom of the skimmer, with a plurality of anteflex wings being regularly arranged in a space formed between the two housings. A power chamber is concentrically positioned inside the lower housing and acts as a main buoyancy chamber of the skimmer. In the operation of the skimmer, an oil slick and an oil-water mixture are introduced into the interior of the lower housing through associated suction pipes while being pumped by associated pumps, thus individually forming a jet allowing the skimmer to be rotatable. In addition, an external blade, mounted to the outside end of one anteflex wing, allows the skimmer to eccentrically rotate and move around within an oil-spilled area when the skimmer rotates due to the jet. In the lower housing, oil is separated from water by a plurality of separation panels capable of separating the oil from the water using a difference in volume ratio between the oil and the water.

1 Claim, 3 Drawing Sheets

6,120,681

OIL SPILL SKIMMER FOR RECOVERING OIL FROM WATER IN THE EVENT OF OIL SPILL ACCIDENT

BACKGROUND OF THE INVENTION

1. Field of the Invention

The present invention relates, in general, to an oil spill skimmer for collecting, skimming up and recovering oil from water in the event of an oil spill accident and, more particularly, to a skimmer designed to be arranged quickly on an oil-spilled area in the occurrence of an oil spill accident, thereby quickly recovering oil from water while restricting a spread of oil over a wide area, and preventing water pollution and contamination of marine environment, and allowing the recovered oil to be recycled.

2. Description of the Prior Art

In the occurrence of an oil spill accident, it is necessary to remove oil from water to prevent oil from contaminating marine environment. In order to remove oil from water in the event of such an oil spill accident, an emulsifying agent may be spread on the water within an oil-spilled area, thus sinking oil to the sea bed. Alternatively, a great number of oil absorption sheets, made of paper or cloth, may be floated on the water within the oil-spilled area, thus absorbing oil prior to being recovered. However, the two methods are problematic in that they fail to effectively or almost completely remove oil from the water in addition to wasting labor, cost and equipment. In addition, it typically takes several hours, at least, or several days, sometimes, to arrange the main components of recovery equipment which may be sufficient to cope with large scale recovery, containment and separation of oil in the oil-spilled area, in the event of an oil spill accident, and so there may be a need for initial, emergency equipment to be rushed to the area prior to the complete operational set-up of the main components of recovery equipment. However, such initial, emergency equipment is not designed to contain the recovered oil-water mixture or separate oil from the mixture, thus regrettably allowing the oil slick to spread over a wide area, where it is very difficult or almost impossible for the main components of recovery equipment to completely recover oil from the water, due to tides, waves, winds and/or currents. That is, as the initial, emergency equipment fails to effectively recover oil from the water or to restrict the oil-spilled area within a limited area, the oil quickly spreads over a wide area along with waves, tides, currents and/or winds, thus forming an oil film on the water over a wide area before the main components of recovery equipment reaches the oil-spilled area. It is very difficult for the main components of recovery equipment to recover or separate such an oil film, particularly a heavy oil film, thus resulting in a serious contamination of marine environment.

SUMMARY OF THE INVENTION

Accordingly, the present invention has been made keeping in mind the above problems occurring in the prior art, and an object of the present invention is to provide an oil spill skimmer, which is designed to be arranged quickly on an oil-spilled area in the event of an oil spill accident, thereby quickly recovering from water while restricting a spread of oil over a wide area, and which thus prevents water pollution and contamination of marine environment, and which also allows the recovered oil to be recycled.

In order to accomplish the above object, the present invention provides an oil spill skimmer, which is designed to be arranged quickly on an oil-spilled area in the event of an oil spill accident and to rotate and move itself around within the oil-spilled area, thereby quickly recovering oil from water while restricting a spread of oil over a wide area. In the skimmer, upper and lower housings are arranged in the top and bottom of the skimmer, with a plurality of anteflex wings being regularly arranged in a space formed between the two housings and forming an intermediate buoyancy chamber of the skimmer. A power chamber, acting as a main buoyancy chamber of the skimmer, is concentrically positioned inside the lower housing. A plurality of oil and water suction pipes, individually provided with a pump, and a blower are installed in the skimmer. In the oil recovering operation of the skimmer, an oil slick and an oil-water mixture are introduced into the interior of the lower housing through associated suction pipes while being pumped by associated pumps, thus individually forming a jet allowing the skimmer to be rotatable. In addition, an external blade, mounted to the outside end of one anteflex wing, allows the skimmer to eccentrically rotate and move around within an oil-spilled area when the skimmer rotates due to the jet. In the lower housing, oil is separated from water by a plurality of separation panels, designed to separate the oil from the water using a difference in volume ratio between the oil and the water. The skimmer of this invention is controlled through a radio communication. In the event of an oil spill accident, a plurality of skimmers of this invention are quickly dropped within the oil-spilled area and suck oil and oil-water mixture into the interior of the lower housing prior to separating oil from water using the separation panels. Each skimmer also temporarily contains recovered oil in the interior of the lower housing. When a skimmer is filled with oil, the skimmer is picked up prior to recovering the oil from the skimmer by a recovery ship designed for large scale recovery, containment and separation of oil. In order to empty the oil, each skimmer has an oil emptying pipe. The skimmer of this invention thus effectively prevents water pollution and a serious contamination of marine environment in the occurrence of an oil spill accident. The skimmer also allows the recovered oil to be recycled.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
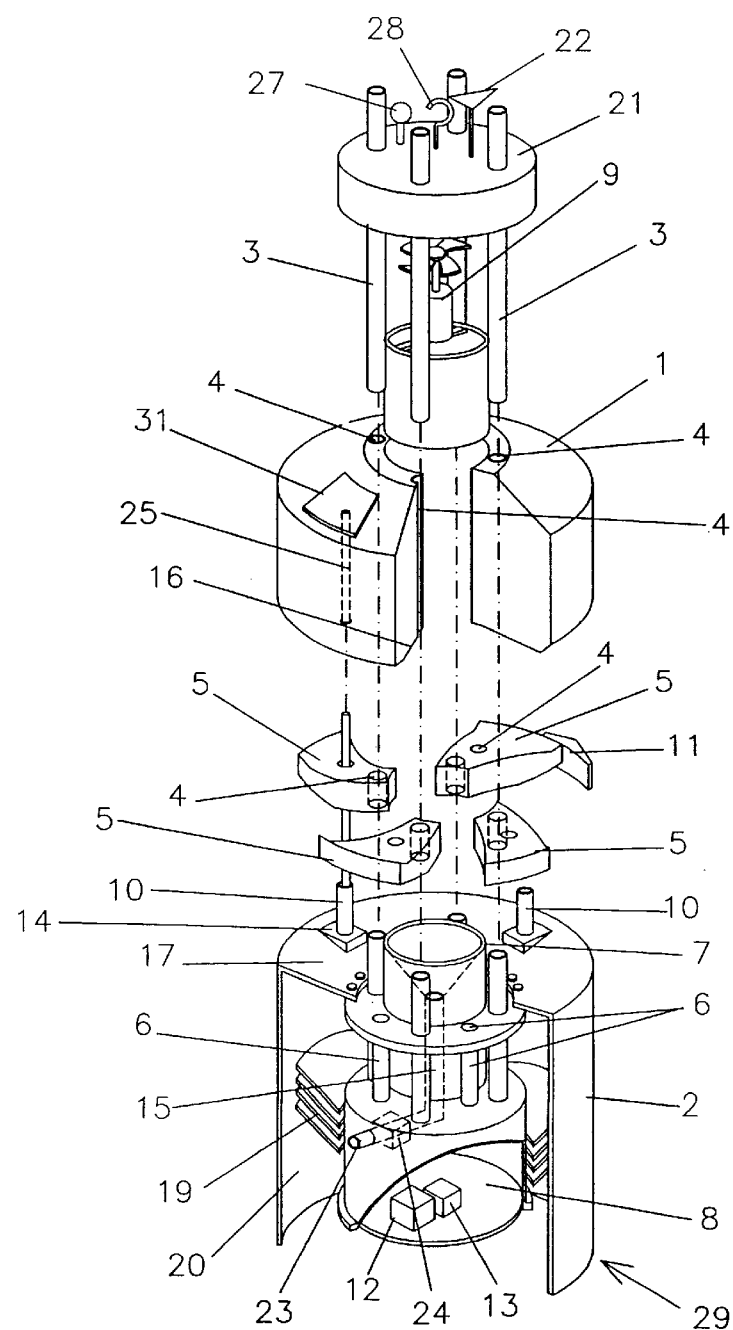
FIG. 1 is a partially broken, exploded perspective view of an oil spill skimmer in accordance with the preferred embodiment of the present invention.
Figure 2:
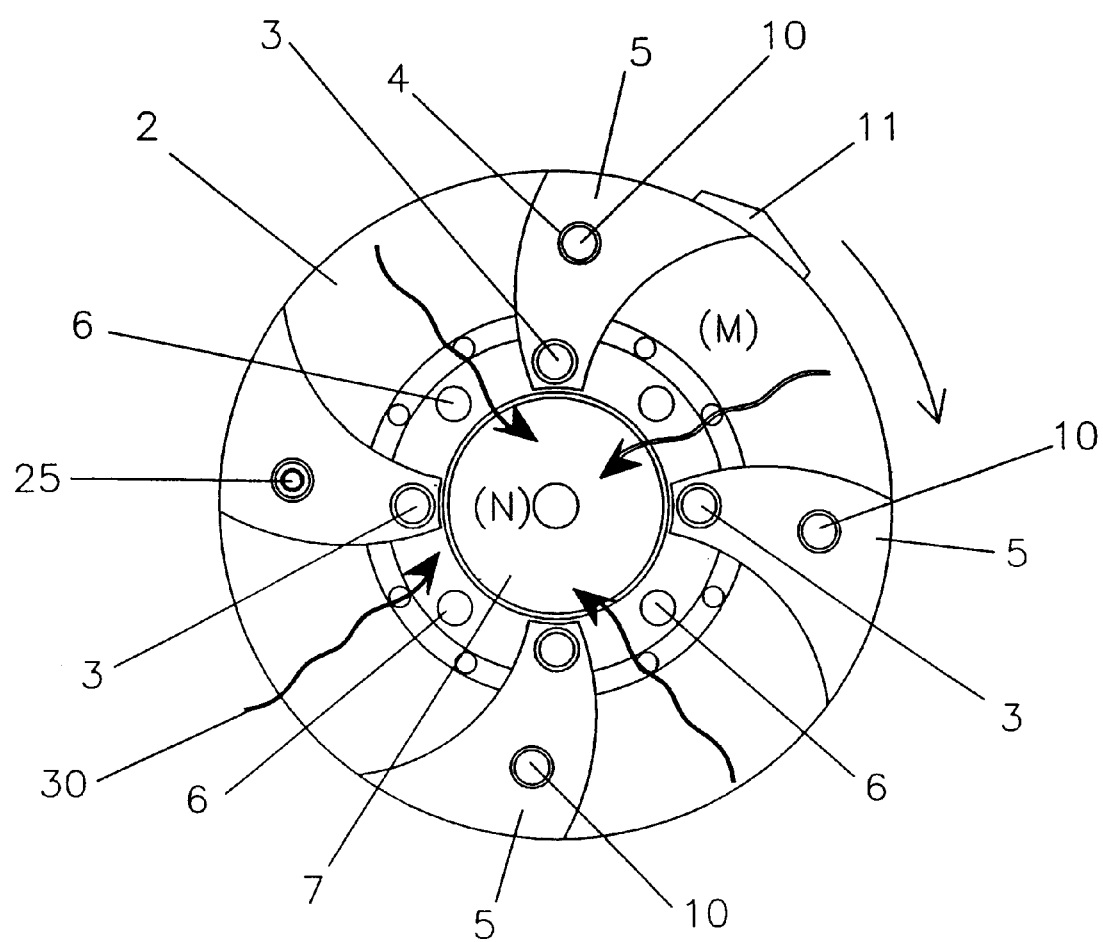
FIG. 2 is a partially exploded plan view of a lower housing of the oil spill skimmer according to this invention.
Figure 3:
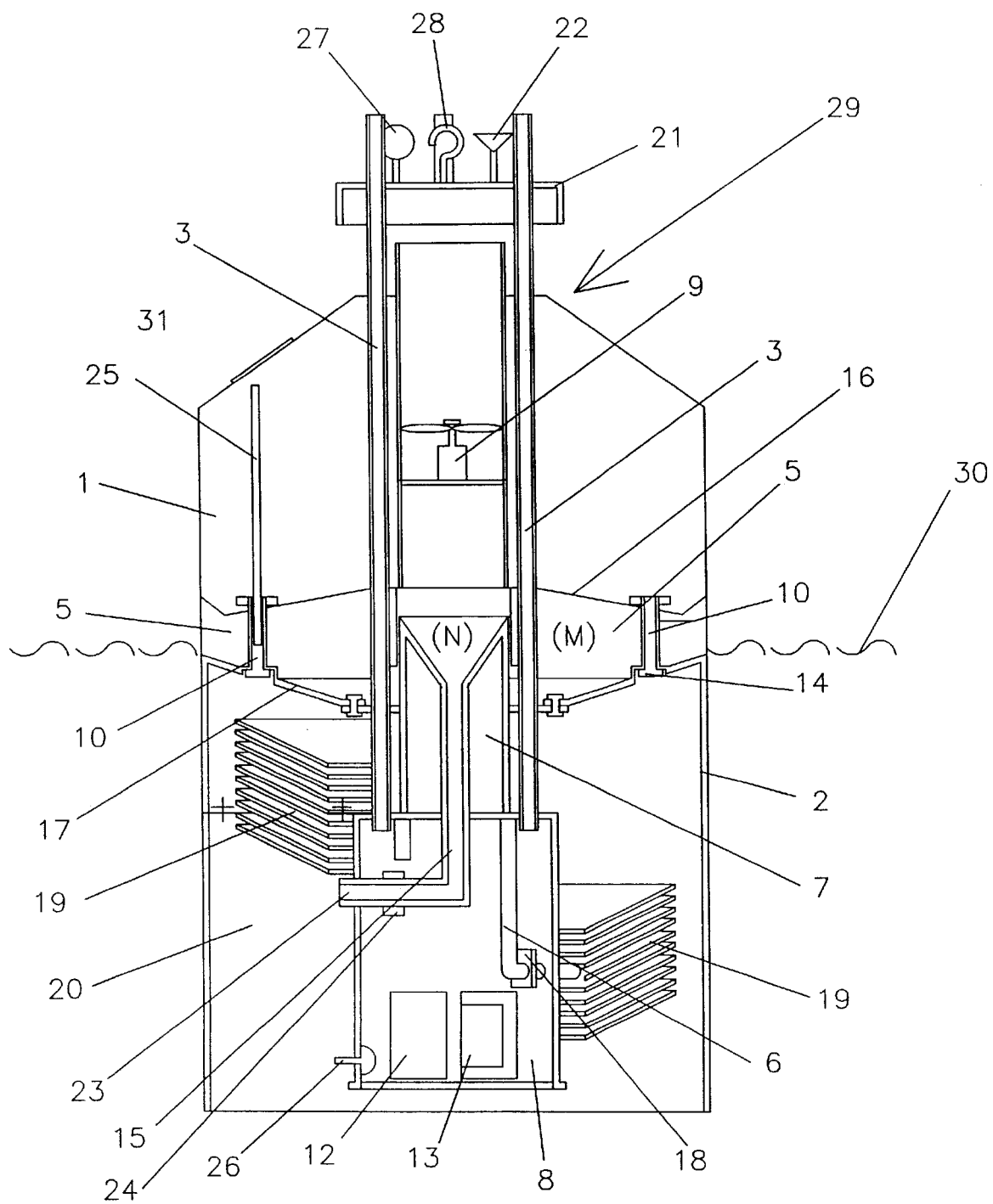
FIG. 3 is a longitudinal sectional view of the oil spill skimmer of this invention, with the parts of the skimmer being assembled into a single structure.

FIGS. 1 to 3 show an oil spill skimmer in accordance with the preferred embodiment of this invention. As shown in the drawings, the skimmer 29 comprises two housings, that is, an upper housing 1 and a lower housing 2, both being axially arranged on the top and bottom of the skimmer 29, respectively. The upper housing 1 has a plurality of vertical holes 4 and an oil emptying pipe 25. A blower 9 is fixedly installed in the upper housing 1. On the other hand, the lower housing 2 has a plurality of vertical holes 4 at a position corresponding to the vertical holes of the upper housing 1. The lower housing 2 is assembled with the bottom wall of the upper housing 1 using a plurality of connection pipes 10 in a way such that a predetermined space is formed between the two housings 1 and 2. The above connection pipes 10 are individually fixed to a bracket 14 integrally formed on the top wall of the lower housing 2. In such a case, the oil emptying pipe 25 of the upper housing 1 is connected to one of the connection pipes 10 and communicates with the interior of the lower housing. The interior of the lower housing 2 forms an oil container 20 used for temporarily containing oil therein. On the other hand, the oil emptying pipe 25 is used for emptying the interior of the lower housing 2 when the lower housing is filled with a predetermined amount of recovered oil.

The skimmer 29 also has a top cover 21 at a position above the upper housing 1 with a space being formed between the upper housing 1 and the top cover 21. The above top cover 21 carries a position lamp 27, a towing hook 28 and a radio transmitter 22 thereon. A power chamber 8 is concentrically positioned inside the lower housing 2 and acts as a main buoyancy chamber of the skimmer 29. Both a motor 12 and an air compressor 13 are installed in the power chamber 8. A plurality of anteflex wings 5, individually having a vertical hole 4, are regularly arranged in the space between the upper and lower housings 1 and 2 while being held by the connection pipes 10. The anteflex wings 5 form an intermediate buoyancy chamber of the skimmer 29. An external blade 11 is fixedly mounted to the outside end of one of the anteflex wings 5, thus allowing the skimmer 29 to eccentrically rotate when the skimmer rotates as will be described later herein. The skimmer 29 further comprises an oil suction chamber 7. The above oil suction chamber 7 is provided on the power chamber 8 with the top opening of the suction chamber 7 being positioned above the top wall of the lower housing 2 at the center of the intermediate buoyancy chamber. A plurality of air suction pipes 3 are regularly set in the top cover 21 with the top ends of the air suction pipes 3 being projected above the top cover 21. The above air suction pipes 3 also axially extend into the power chamber 8 while passing through the vertical holes 4 of both the anteflex wings 5 and the two housings 1 and 2.

A skim pipe 15 extends from the top opening of the oil suction chamber 7, and passes through the power chamber 8 prior to being bent at an angle so as to have an outlet port 23 projected from the sidewall of the power chamber 8 into the interior of the lower housing 2. The skim pipe 15 is used for sucking oil floating on the water and discharging the oil into the interior of the lower housing 2 while allowing the skimmer 29 to be rotatable due to an oil jet discharged from the skim pipe 15. A skim pump 24 is mounted to the outlet port 23 of the skim pipe 15 and is used for pumping the oil passing through the skim pipe 15. A plurality of separation panels 19 are mounted in the interior of the lower housing 2 at a lower portion and are used for separating oil from water using a difference in volume ratio between the oil and the water. The skimmer 29 also has a plurality of oil-water suction pipes 6. The above pipes 6 are regularly arranged around the oil suction chamber 7 and pass through the power chamber 8 prior to being bent at an angle so as to have an outlet port projected from the sidewall of the power chamber 8 into the interior of the lower housing 2. The oil-water suction pipes 6 are used for sucking an oil-water mixture from the water and discharging the oil-water mixture into the interior of the lower housing 2 while allowing the skimmer 29 to be rotatable due to an oil-water jet discharged from the oil-water suction pipes 6. An oil-water pump 18 is mounted to the outlet portion of each of the oil-water suction pipes 6, thus pumping the oil-water mixture passing through the suction pipes 6. Mounted to the sidewall of the power chamber 8 at a lower portion is an oil sensor 26. The above oil sensor 26 is used for sensing an oil level in the interior of the lower housing 2 prior to outputting a signal through the radio transmitter 22 to a user.

In the drawings, the reference numeral 30 denotes a sea level, 31 denotes a cap provided at the upper housing 1 so as to cover the outlet end of the oil emptying pipe 25. The reference characters N and M of the drawings denote an internal suction chamber and an external suction chamber, respectively.

The above skimmer 29 is used and operated as will be described hereinbelow.

In the occurrence of an oil spill accident, a plurality of skimmers 29 of this invention are dropped from airplanes or ships within the oil-spilled area. In such a case, the skimmers 29 individually float on the water due to both the main buoyancy chamber, formed by the power chamber 8, and the intermediate buoyancy chamber formed by the anteflex wings 5. When a user outputs a start signal to the skimmers 29 through a radio communication, the motor 12, installed in the power chamber 8, is started along with both the blower 9 and the water pump 18. The blower 9 thus sucks atmospheric air under pressure into the skimmer 29. In such a case, oil, floating on the water, is sucked into the skimmer 29 along with the pressurized air through the intermediate buoyancy chamber. In addition, an oil-water mixture under pressure is sucked into the skimmer 29 through the oil-water suction pipes 6 arranged in the external suction chamber M. The oil-water mixture under pressure is, thereafter, discharged into the interior of the lower housing 2 from the suction pipes 6 while being pumped by the pump 18, thus allowing the skimmer 29 to rotate on the water due to an oil-water jet discharged from the outlet ports of the suction pipes 6. In such a case, the internal pressure of the suction chamber 7, comprising the internal and external suction chambers N and M, is lower than the atmospheric pressure, and so the water level in the chamber 7 is higher than the sea level 30. Therefore, the oil, floating on the water, is introduced into the internal suction chamber N and passes through the skim pipe 15. Thereafter, the oil is discharged into the interior of the lower housing 2 through the outlet port 24 of the skim pipe 15 while being pumped by the skim pump 24. In such a case, the pressurized oil, discharged from the skim pipe 15, forms an oil jet which allows the skimmer 29 to rotate in cooperation with the oil-water jet discharged from the outlet ports of the pipes 6. When the skimmer 29 rotates as described above, the anteflex wings 5, regularly arranged between the two housings 1 and 2 and held by the connection pipes 10, are rotated in the same direction, thus more effectively guiding oil into the lower housing 2.

In such a case, the external blade 11, attached to one of the anteflex wings 5, is also rotated in the same direction while forming a resistance against the water. Therefore, the skimmer 29 eccentrically rotates and moves around within the oil-spilled area, thus effectively collecting and skimming up the oil over a wide area. The oil-water mixture, introduced into the interior of the lower housing 2 through the suction pipes 6, is separated into oil and water by the separation panels 19 due to a difference in volume ratio between oil and water. That is, the water is lowered, while the oil floats on the water. Therefore, an interface is formed between the oil and the water in the interior of the lower housing 2. The oil, separated from the water, is temporarily contained in the interior of the lower housing 2.

When a plurality of skimmers 29 of this invention are arranged on the oil-spilled area in the event of an oil spill accident, it is possible to quickly recover the oil from the water before the oil spill accident causes a serious contamination of marine environment. When the interior of the lower housing 2 of a skimmer 29 is filled with a predetermined amount of oil, the oil sensor 26 senses the oil level and outputs a signal to a user through the radio transmitter 22 carried on the top cover 21. When receiving the signal from the radio transmitter 22, the user picks up the oil-filled skimmer 29 which is distinguishable from the other skimmers 29 by its position lamp 27. The oil of the skimmer 29 is recovered through the external connection pipe 25, and so the skimmer 29 is emptied prior to being dropped again on the water. The empty skimmer 29 thus performs a new oil skimming operation.

When the oil on the oil-spilled area is completely recovered by the skimmers 29, the skimmers 29 are picked up by a ship. In such a case, a tow rope is connected to the towing hook 28, mounted to the top cover 21, prior to picking up each skimmer 29 by pulling the tow rope.

As described above, the present invention provides an oil spill skimmer. It is possible for a user to control a plurality of skimmers on an oil-spilled area while conserving labor. That is, the skimmer is designed to be easily controlled by the user through a radio communication and to allow the user to easily find the position of the skimmers on the oil-spilled area. In the event of an oil spill accident, a plurality of skimmers of this invention are quickly dropped on the water within the oil-spilled area, thus effectively recovering the oil within a short period of time while restricting the oil-spilled area within a limited area. Therefore, the skimmer of this invention quickly and effectively copes with such an oil spill accident on, for example, the sea, thus preventing water pollution and a serious contamination of marine environment. Another advantage of the skimmer according to this invention resides in that the skimmer allows the recovered oil to be recycled.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An oil spill skimmer for recovering oil from water in the event of an oil spill accident, comprising:

an upper housing having an oil emptying pipe;

a top cover positioned above said upper housing while being spaced apart from the upper housing, said top cover carrying a position lamp, a towing hook and a radio transmitter;

a lower housing having a plurality of vertical holes and assembled with the bottom wall of the upper housing using a plurality of connection pipes, with a space being formed between the upper and lower housings, said connection pipes being individually fixed to a bracket integrally formed on a top wall of said lower housing, with the oil emptying pipe of the upper housing being connected to one of the connection pipes and communicating with the interior of the lower housing, said interior of the lower housing forming an oil container used for temporarily containing recovered oil therein;

a power chamber concentrically positioned inside the lower housing and acting as a main buoyancy chamber of the skimmer, with both a motor and an air compressor being installed in said power chamber;

a plurality of anteflex wings individually having a vertical hole, said anteflex wings being regularly arranged in the space between the upper and lower housings while being held by the connection pipes, thus forming an intermediate buoyancy chamber of the skimmer;

an external blade mounted to an outside end of one of said anteflex wings, thus allowing the skimmer to eccentrically rotate and move around within an oil-spilled area when the skimmer rotates;

an oil suction chamber provided on the power chamber with a top opening of the suction chamber being positioned above the top wall of said lower housing at the center of the intermediate buoyancy chamber;

a plurality of air suction pipes regularly set in the top cover with top ends of said air suction pipes being projected above the top cover, said air suction pipes also axially extending into the power chamber while passing through the vertical holes of both the anteflex wings and the two housings;

a blower fixedly installed in the upper housing;

a skim pipe extending from the top opening of the oil suction chamber, and passing through the power chamber prior to being bent at an angle so as to have an outlet port projected from a sidewall of the power chamber into the interior of said lower housing, said skim pipe being adapted for sucking oil floating on the water and discharging the oil under pressure into the interior of said lower housing while allowing the skimmer to be rotatable due to an oil jet discharged from the outlet port of the skim pipe;

a skim pump mounted to the outlet port of said skim pipe and adapted for pumping the oil passing through the skim pipe;

a plurality of oil-water suction pipes regularly arranged around the oil suction chamber and passing through the power chamber prior to being bent at an angle so as to have an outlet port projected from the sidewall of the power chamber into the interior of said lower housing, said oil-water suction pipes being adapted for sucking an oil-water mixture from the water and discharging the oil-water mixture under pressure into the interior of said lower housing while allowing the skimmer to be rotatable due to an oil-water jet discharged from the outlet ports of the oil-water suction pipes;

an oil-water pump mounted to the outlet portion of each of said oil-water suction pipes, thus pumping the oil-water mixture passing through the oil-water suction pipes;

a plurality of separation panels mounted in the interior of said lower housing at a lower portion and adapted for separating oil from water using a difference in volume ratio between the oil and the water; and an oil sensor mounted to the sidewall of said power chamber at a lower portion and used for sensing an oil level in the interior of said lower housing prior to outputting a signal through the radio transmitter.

* * * * *